(12) United States Patent
Padovani

(10) Patent No.: US 6,999,766 B1
(45) Date of Patent: Feb. 14, 2006

(54) METHOD AND APPARATUS FOR OPTIMIZATION OF A CELLULAR NETWORK

(75) Inventor: Roberto Padovani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 22 days.

(21) Appl. No.: 08/858,245

(22) Filed: May 19, 1997

(51) Int. Cl.
H04Q 7/20 (2006.01)

(52) U.S. Cl. .................................. 455/437; 455/561
(58) Field of Classification Search ............. 455/67.1, 455/67.3, 69, 522, 561, 562, 437, 436, 438, 455/439, 442, 443, 524, 525, 560; 370/342, 370/331, 332
See application file for complete search history.

(56) References Cited

U.S. PATENT DOCUMENTS

| | | | |
|---|---|---|---|
| 3,819,872 A | 6/1974 | Hamrick | 379/60 |
| 4,112,257 A | 9/1978 | Frost | 179/2 |
| 4,222,115 A | 9/1980 | Cooper et al. | 375/1 |
| 4,398,063 A | 8/1983 | Hass et al. | 179/2 EB |
| 4,475,010 A | 10/1984 | Huensch et al. | 179/2 |
| 4,608,711 A | 8/1986 | Goldman | 455/33 |
| 4,672,658 A | 6/1987 | Kavehrad et al. | 379/63 |
| 4,718,081 A | 1/1988 | Brenig | 379/60 |
| 4,765,753 A | 8/1988 | Schmidt | 379/60 |
| 5,054,110 A | 10/1991 | Comroe et al. | 455/33 |
| 5,056,109 A | 10/1991 | Gilhousen et al. | 375/1 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,109,528 A | 4/1992 | Uddenfeldt | 455/33.2 |
| 5,127,100 A | 6/1992 | D'Amico | 455/33.1 |
| 5,164,958 A | 11/1992 | Omura | 375/1 |
| 5,179,571 A | 1/1993 | Schilling | 375/1 |
| 5,265,119 A | 11/1993 | Gilhousen et al. | 375/1 |
| 5,267,261 A | 11/1993 | Blakeney, II et al. | 375/1 |
| 5,267,262 A | 11/1993 | Wheatley | 375/1 |
| 5,309,474 A | 5/1994 | Gilhousen et al. | 375/1 |
| 5,327,577 A | 7/1994 | Uddenfeldt | 455/33.2 |
| 5,375,123 A * | 12/1994 | Andersson et al. | 455/437 |
| 5,603,089 A * | 2/1997 | Searle et al. | 455/562 |
| 5,722,073 A * | 2/1998 | Wallstedt et al. | 455/437 |
| 5,734,646 A * | 3/1998 | I et al. | 370/335 |
| 5,771,461 A * | 6/1998 | Love et al. | 455/522 |
| 5,893,033 A * | 4/1999 | Keskitalo et al. | 455/562 |
| 5,915,221 A * | 6/1999 | Sawyer et al. | 455/437 |

FOREIGN PATENT DOCUMENTS

EP 0421535 10/1990

\* cited by examiner

Primary Examiner—Nguyen T. Vo
(74) Attorney, Agent, or Firm—Russell B. Miller; William M. Hooks

(57) ABSTRACT

A method and apparatus for optimizing system parameters in a cellular communication network. Pilot strength measurement messages (PSMMs) that are received by bases stations of the network to be optimized are saved in a database. The database accumulates the raw data contained in the pilot strength measurement messages. After a sufficient amount of data has been collected, a report generator compiles a statistics report for each base station based on the raw PSMM data. The present invention then provides a method for applying the information in the report in order to optimize the network parameters of the cellular system. The neighbor list which is transmitted on the paging or traffic channel is revised in accordance with the compiled statistics. The antenna tilt of the base stations is adjusted in accordance with the compiled statistics.

16 Claims, 5 Drawing Sheets

METHOD AND APPARATUS FOR OPTIMIZATION OF A CELLULAR NETWORK

BACKGROUND OF THE INVENTION

I. Field of the Invention

The present invention relates to communications. More particularly, the present invention relates to a novel and improved method and apparatus for optimizing a cellular network using empirical data received by base stations.

II. Description of the Related Art

Currently, cellular systems are designed using simulation design tools such as those described in U.S. patent application Ser. No. 08/515,772, entitled "INTERACTIVE GRAPHICAL TOOLS FOR CELLULAR SYSTEM DESIGN", filed Aug. 16, 1995, and in U.S. patent application Ser. No. 08/535,999, entitled "CDMA NETWORK PERFORMANCE ANALYSIS TOOL", filed Sep. 29, 1995, both of which are assigned to the assignee of the present invention and are incorporated by reference herein. The data provided by these simulations is limited by the amount of information regarding the terrain and propagation path characteristics that are provided to the simulation.

The aforementioned patent application Ser. No. 08/535,999 describes in detail a method and apparatus for planning a code division multiple access wireless telecommunications network. An electronic representation of wireless telecommunications system can be configured within a given market area and the operation of that wireless telecommunications system simulated. The simulation is performed using a set of databases that contain terrain and population information associated with the market area over which the wireless network in configured. To perform the simulation a composite propagation loss matrix and a demand and service vector are generated using the terrain and population information. Once the propagation loss matrix and the demand and service vector are generated an analysis of the reverse link is performed. Subsequently, an analysis of the forward link is performed. During both the reverse and forward link analysis the multiple iterations of analysis are performed until a stable result is achieved. Upon completion of the reverse and forward link analysis, the results of the simulation are displayed in a graphical manner for examination.

The aforementioned patent application Ser. No. 08/515,772 describes in detail a method and apparatus for providing network planning information in an interactive manner. A user selects a planning tool and inputs a selection point. If a line of sight cursor tool has been selected, a set of points on a display are set indicating a line of sight exists from those points to the selected point. If a path loss cursor tool has been selected a set of points on a display are set indicating that path loss to the selection point is less than a certain threshold. Alternatively, a set of point on the display are set to various colors or shades indicating a range of path loss amounts to the selected point. In the preferred embodiment the invention incorporates the use of a computer system.

A second step that is frequently used to determine network parameters is to perform "dry runs" on the equipment by sending test mobile stations into the field. However, these tests are generally very time consuming and limited to generally a small set of predefined locations. On the other hand, during commercial operation users which access the network freely from any location within the coverage provide important and useful information to the network operator via the PSMM's.

The use of code division multiple access (CDMA) modulation techniques is but one of several techniques for facilitating communications in which a large number of system users are present. Although other techniques, such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS" and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and are incorporated by reference. The method for providing CDMA mobile communications was standardized by the Telecommunications Industry Association in TIA/EIA/IS-95-A entitled "Mobile Station-Base Station Compatibility Standard for Dual-Mode Wideband Spread Spectrum Cellular System" (hereafter IS-95).

In the just mentioned patents, a multiple access technique is disclosed in which a large number of mobile telephone users, each having a transceiver, communicate through satellite repeaters or terrestrial base stations (also known as cell base stations or cell-sites) using code division multiple access (CDMA) spread spectrum communication signals. In using CDMA communications, the frequency spectrum can be reused multiple times thus permitting an increase in system user capacity. The use of CDMA techniques results in much higher spectral efficiency than can be achieved using other multiple access techniques.

A method for simultaneously demodulating data that has traveled along different propagation paths from one base station and for simultaneously demodulating data redundantly provided from more than one base station is disclosed in U.S. Pat. No. 5,109,390 (the '390 patent), entitled "DIVERSITY RECEIVER IN A CDMA CELLULAR COMMUNICATION SYSTEM", assigned to the assignee of the present invention and incorporated by reference herein. In the '390 patent, the separately demodulated signals are combined to provide an estimate of the transmitted data which has higher reliability than the data demodulated by any one path or from any one base station.

Handoffs can generally be divided into two categories—hard handoffs and soft handoffs. In a hard handoff, when a mobile station leaves and origination cell and enters a destination cell, the mobile station breaks its communication link with the origination cell and thereafter establishes a new communication link with the destination cell. In soft handoff, the mobile station completes a communication link with the destination cell prior to breaking its communication link with the origination cell. Thus, in soft handoff, the mobile station is redundantly in communication with both the origination cell and the destination cell for some period of time.

Soft handoffs are far less likely to drop calls than hard handoffs. In addition, when a mobile station travels near a cell boundary, it may make repeated handoff requests in response to small changes in the environment. This problem, referred to as ping-ponging, is also greatly lessened by soft handoff. The process for performing soft handoff is described in detail in U.S. Pat. No. 5,101,501, entitled "METHOD AND SYSTEM FOR PROVIDING A SOFT HANDOFF IN COMMUNICATIONS IN A CDMA CEL- LULAR TELEPHONE SYSTEM" assigned to the assignee of the present invention and incorporated by reference herein.

An improved soft handoff technique is disclosed in U.S. Pat. No. 5,267,261 (the '261 patent), entitled "MOBILE STATION ASSISTED SOFT HANDOFF IN A CDMA CELLULAR COMMUNICATIONS SYSTEM", which is assigned to the assignee of the present invention and incorporated by reference herein. In the system of the '261 patent, the soft handoff process is improved by measuring the strength of "pilot" signals transmitted by each base station within the system at the mobile station. These pilot strength measurements are of assistance in the soft handoff process by facilitating identification of base station handoff candidates capable of providing reliable communication with the mobile station.

The base station candidates can be divided into four sets. The first set, referred to as the Active Set, comprises base stations which are currently in communication with the mobile station. The second set, referred to as the Candidate Set, comprises base stations which have been determined to be of sufficient strength to provide reliable communications with the mobile station. Base stations are added to the candidate set when their measured pilot energy exceeds a predetermined threshold $T_{ADD}$. The third set, referred to as the Neighbor Set, is the set of base stations which are in the vicinity of the mobile station (and which are not included in the Active Set or the Candidate Set). And the fourth set is the Remaining Set which consists of all other base stations.

When a CDMA base station is configured, there are many parameters that can potentially vary. For example, each IS-95 base station transmits a neighbor list that identifies the base stations which are most likely to be able to communicate with a mobile station in the area. The members of the neighbor list may simply include the base stations that are most closely located to that base station and are frequently determined in accordance with simulation programs like those described above. However, it is possible that the cells that are able to provide reliable communications with the base station are not simply the base stations most closely located. Some base stations that are close to that base station may be blocked by obstructions. Conversely, some distant base stations may be able to provide communications to a mobile station within the coverage of the base station owing to clear propagation path. In addition, configuration of the base stations, including the tilt of the antenna, the azimuth angle of the sector antennas, the total transmit power of the base station and the physical location of the base station are all capable of changing to further optimize the network configuration.

In an IS-95 communication system, the mobile station sends a Pilot Strength Measurement Message when it finds a pilot of sufficient strength that is not associated with any of the Forward Traffic Channels currently being demodulated or when the strength of a pilot that is associated with one of the Forward Traffic Channels being demodulated drops below a threshold for a predetermined period of time. The mobile station sends a Pilot Strength Measurement Message following the detection of a change in the strength of a pilot under the following three conditions:

1. The strength of a Neighbor Set or Remaining Set pilot is found above the threshold $T_{ADD}$.
2. The strength of a Candidate Set pilot exceeds the strength of an Active Set pilot by more that a threshold $(T_{COMP})$.
3. The strength of a pilot in the Active Set of Candidate Set has fallen below a threshold $(T_{DROP})$ for greater than a predetermined time period.

The Pilot Strength Measurement Message identifies the base station and the measured pilot energy in decibels.

In current systems, the Pilot Strength Measurement Messages (PSMMs) are used to perform handoff operations and are then discarded by the system. However, there is valuable information contained in these messages that can be used to optimize a cellular network. Therefore, a need exists for a method and apparatus that uses the information contained in the transmitted PSMMs to assist in the optimization of network configuration in a cellular communication system. And to provide a method for configuring a cellular network based on true empirical data, as opposed to the limited accuracy of simulated data and data compiled in dry runs.

SUMMARY OF THE INVENTION

The present invention is a novel and improved method and apparatus for optimizing system parameters in a cellular communication network. In the present invention, pilot strength measurement messages that base stations of the system to be optimized are saved in a database. The database accumulates the raw data contained in the pilot strength measurement messages. After a sufficient amount of data has been collected to provide a set of significant statistics, a report generator compiles a statistics report for each base station based on the raw data. In the exemplary embodiment, each base station's statistics report describes the maximum strength, minimum strength and average strength reported for each base station reported in the collection of pilot strength measurement messages.

The report is then used to optimize the network parameters of the cellular system. In the present invention, the neighbor list which is transmitted on the paging or traffic channel is revised in accordance with the compiled statistics. In addition, the transmission characteristics of the base station are modified in accordance with the compiled statistics. In the exemplary embodiment, the antenna tilt of the base stations is adjusted in accordance with the compiled statistics. In alternative embodiments of the present invention, the total transmission power of the base stations, the base station location and the azimuth angle of the sectored antennas can be changed in accordance with the compiled statistics.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
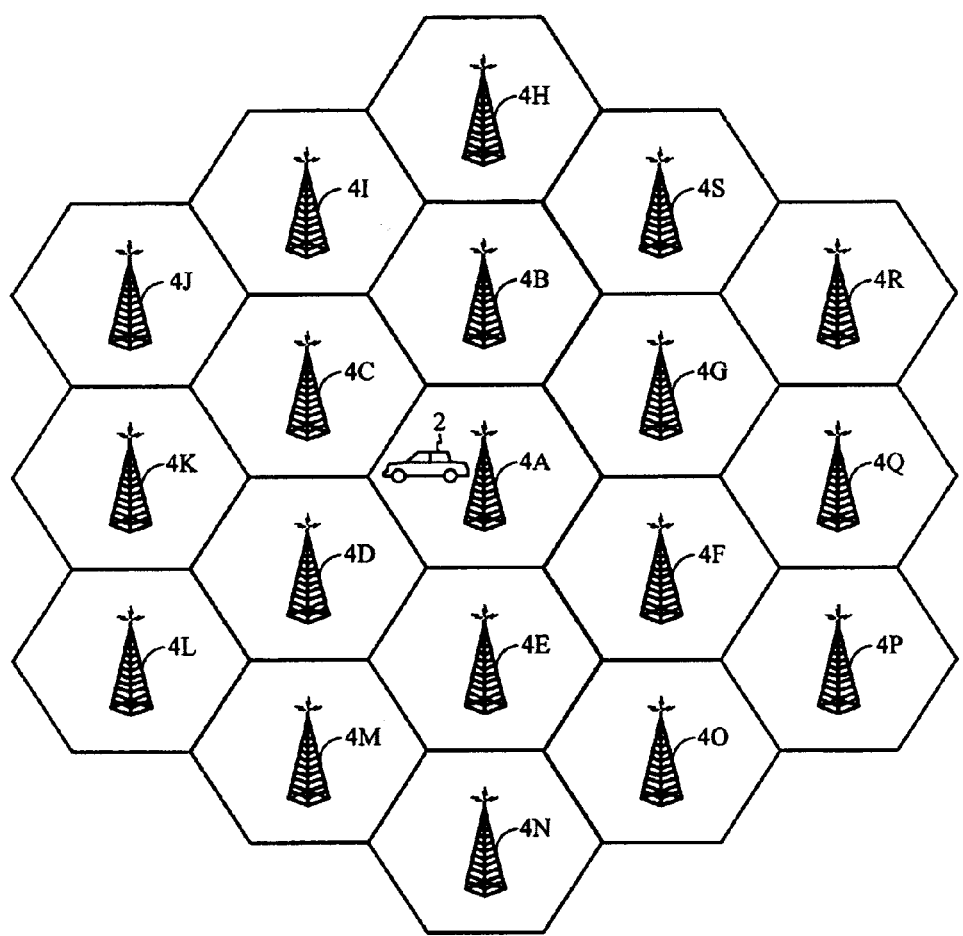
FIG. 1 is an illustration of a cellular communication network.

FIG. 1 illustrates a cellular communication network in which the geographical area has been divided up into coverage areas referred to as cells and illustrated by a set of adjacent hexagons. Each cell is served by a corresponding base station 4. Each base station 4 transmits a pilot signal which uniquely identifies that base station. In addition, each base station 4 transmits, on the paging channel or traffic channel, a neighbor list that identifies base stations most likely to be capable of providing communication with the mobile station. In the exemplary embodiment, the base stations 4 are IS-95 code division multiple access (CDMA) base stations. The generation and contents of a the paging and traffic channela of the exemplary embodiment are described in detail in the IS-95 standard and are well known in the art. In the example of an IS-95 CDMA communication system, the base stations 4 are uniquely identified in accordance with a timing offset for the generation of the pseudonoise sequence used to modulate the transmitted data.

Mobile station 2 is located within the cell served by base station 4A. Since mobile station 2 is located near the cell boundary, it will likely be in a soft hand-off condition, in which it is simultaneously in communication with more than one base station. A detail description of soft hand-off in a wireless CDMA communication system is described in detail in the aforementioned U.S. Pat. Nos. 5,101,501 and 5,267,261. It may, for example, be in communication with base stations 4A and 4B. Thus, base stations 4A and 4B are said to make up the active set. Moreover, it may be that mobile station 2 has determined other base stations in its vicinity to have a measured pilot energy above a predetermined threshold $T_{ADD}$, but those base stations are not currently in communication with the mobile station. Those pilots are said to make up the candidate set. The candidate set could be made up of base stations 4C and 4G.

The neighbor list of base stations comprise a third set of base stations and consist of the base stations identified on the paging or traffic channel of base station 4A. Initially, the base stations identified on the paging or traffic channel are determined in accordance with their physical proximity to base station 4A and based on simulation data. Initially, it may be desirable for base station 4A to transmit a large neighbor set of base stations consisting for example of base stations 4A–4S. As will be seen by the description of the operation of mobile station 2, this overly broad neighbor set may decrease the efficiency of the pilot search operation.

Figure 2:
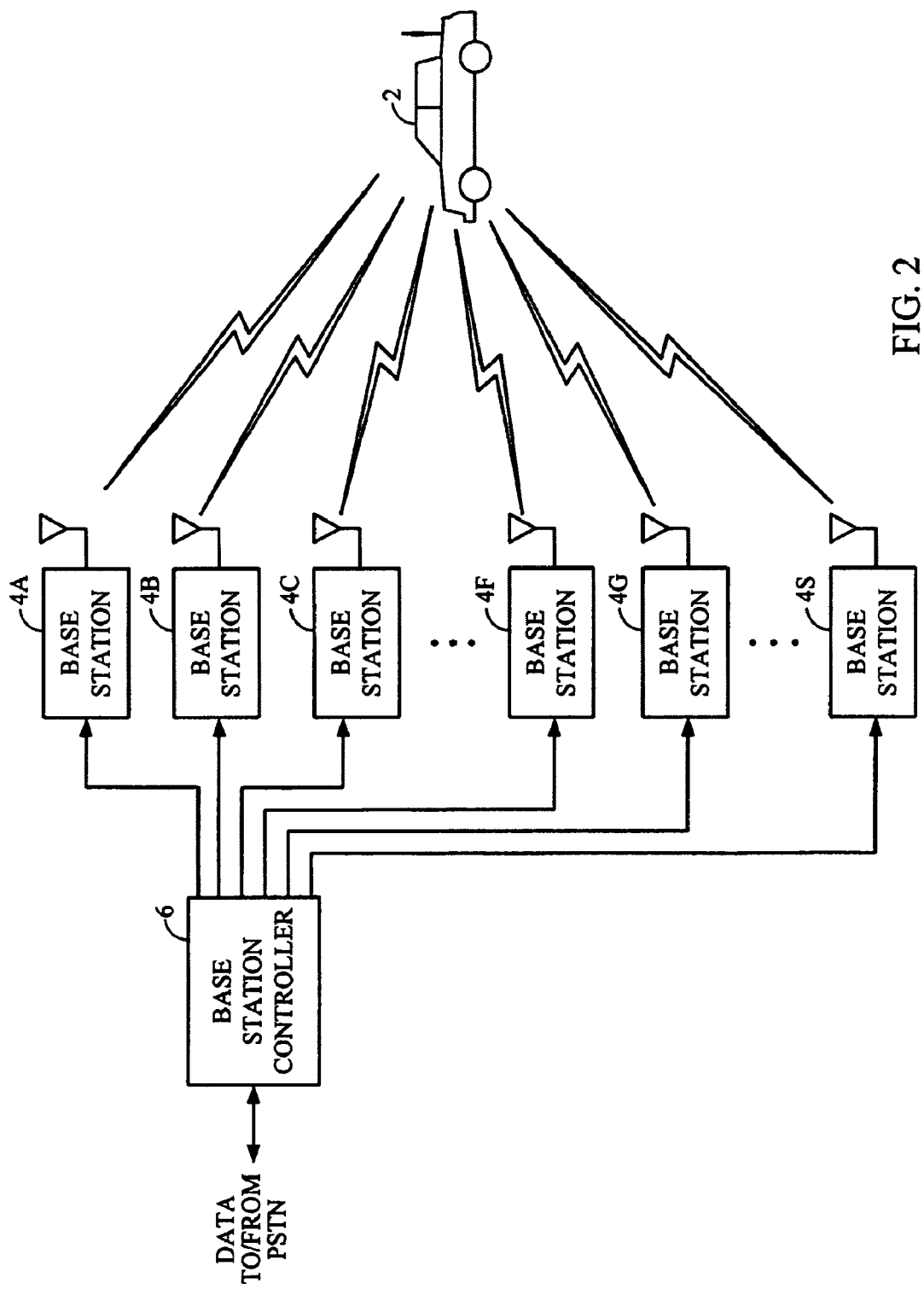
FIG. 2 is an illustration of the cellular communication network of FIG. 1 which includes the base station controller.

Referring to FIG. 2, a typical communication network is illustrated. Data directed mobile station 2 is provided from a public switched telephone network (PSTN) or other wireless system (not shown) to base station controller 6. Base station controller 6 provides the data to the base stations 4 in mobile station 2's active list.

The present invention is equally applicable to conditions where each cell is divided into sectors with each sector being capable of being separately identified. In the exemplary embodiment of an IS-95 wireless communication system, the sectors of a base station are identified uniquely by a timing offset in the pseudonoise (PN) generation sequence. Communications to and from each sector can be separately received and demodulated by mobile station 2. For simplicity, the discussion will be described in terms of separate base stations 4. However, it will be readily seen by one skilled in the art that the present invention is equally extended to sectored cells, simply by considering the possibility that the base stations are collocated and transmitting to separate sectors within a cell. The condition where a mobile station is in simultaneous communication with more than one sector of a cell is referred to as softer handoff. The method and apparatus for providing sectored coverage and for performing softer hand-off are described in detail in copending U.S. patent application Ser. No. 08/144,903, entitled "METHOD AND APPARATUS FOR PERFORMING HANDOFF BETWEEN SECTORS OF A COMMON BASE STATION", filed Oct. 30, 1993, which is assigned to the assignee of the present invention and incorporated by reference herein.

Within mobile station 2, each copy of the data packet is separately received, demodulated and decoded. The decoded data is then combined to give a estimate of the data of greater reliability than any one of demodulated estimates of the data. The apparatus for combining separately received an demodulated data to provide a estimate of greater reliability is described in detail in the aforementioned U.S. Pat. No. 5,109,390.

Figure 3:
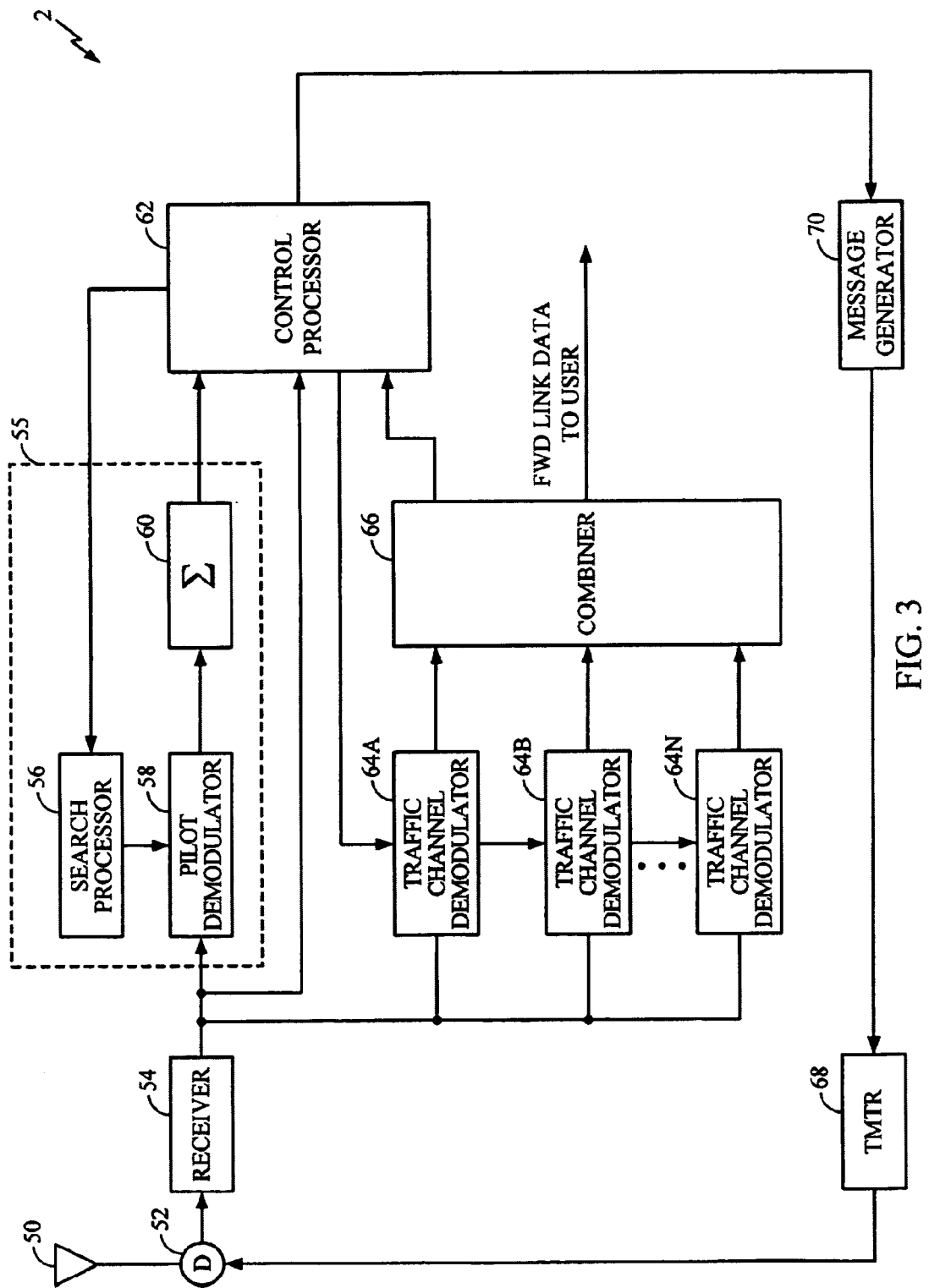
FIG. 3 is a block diagram of the mobile station of the present invention.

FIG. 3 illustrates mobile station 2 for the exemplary embodiment of a CDMA mobile phone. Mobile station 2 continuously or at intermittent intervals measures the strength of pilot signals of base stations 4. Signals received by antenna 50 of mobile station 2 are provided through duplexer 52 to receiver (RCVR) 54 which amplifies downconverts and filters the received signal and provides the signal to pilot demodulator 58 of searcher subsystem 55.

In addition, the received signal is provided to traffic demodulators 64A–64N. Traffic demodulators 64A–64N, or a subset thereof, separately demodulate signals received by to mobile station 2. The demodulated signals from traffic demodulators 64A–64N are provided to combiner 66. Combiner 66 combines the demodulated data to provide an improved estimate of the received data.

Mobile station 2 measures the strength of received pilot signals. Control processor 62 provides acquisition parameters to search processor 56. In the exemplary embodiment of a CDMA communication system, control processor 62 provides a PN offset to search processor 56. In the exemplary embodiment, control processor 56 selects the PN offset hypothesis to test based on its set membership. Base stations 4 in the active set are tested the most frequently. Base stations 4 in the candidate set are the second most frequently tested. Base stations 4 in the neighbor set are the third most frequently tested. And base stations 4 in the remaining set are tested the least frequently.

If the neighbor set contains extraneous members, which though in the physical proximity of base station 4A, are incapable of providing communications to mobile station 2, then the efficiency of the search operation will be degraded. Those base stations in the neighbor set that are most likely to be capable of providing communication to mobile station 2 will be tested less frequently than if the neighbor set consisted only of base stations 4 capable of providing communications to mobile station 2. In addition, when a mobile station 2 is soft handoff the combination of all neighbor set base stations transmitted by each of the base stations in active communication with mobile station 2 may yield an unreasonably large combined neighbor set which may result in mobile station 2 trimming the set without sufficient information to accurately perform the trimming process.

Search processor 56 generates a PN sequence which is used by pilot demodulator 58 to demodulate the received signal. The demodulated pilot signal is provided to energy accumulator 60 which measures the energy of the demodulated pilot signal, by accumulating the energy for predetermined sequence length. The measured pilot energy values are provided to control processor 62. In the exemplary embodiment, control processor 62 compares the energy values to thresholds $T_{ADD}$ and $T_{DROP}$. $T_{ADD}$ is threshold above which the received signal is of sufficient strength to effectively provide communications with mobile station 2. $T_{DROP}$ is a threshold value below which the received signal energy is insufficient to effectively provide communications with mobile station 2.

Mobile station 2 transmits a Pilot Strength Measurement Message which includes all pilots with energy greater than $T_{ADD}$ and all members of the current active set who's measured pilot energy has not fallen below $T_{DROP}$ for more than a predetermined time period. In the exemplary embodiment, mobile station 2 generates and transmits a Pilot Strength Measurement Message (PSMM) following the detection of a change in the strength of a pilot under the following three conditions:

1. The strength of a neighbor Set or Remaining Set pilot is found above the threshold $T_{ADD}$.
2. The strength of a Candidate Set pilot exceeds the strength of an Active Set pilot by more that a threshold ($T_{COMP}$).
3. The strength of a pilot in the Active Set has fallen below a threshold ($T_{DROP}$) for greater than a predetermined time period.

In the exemplary embodiment, the Pilot Strength Measurement Message identifies the pilot and provides a corresponding measured pilot energy. In the exemplary embodiment, the base stations in the Pilot Strength Measurement Message are identified by their pilot offsets and their corresponding measured pilot energy is provided in units of decibels.

Control processor 62 provides the identities of the pilots and their corresponding measured pilot energies to message generator 70. Message generator 70 generates a Pilot Strength Measurement Message containing the information. The Pilot Strength Measurement Message is provided to transmitter (TMTR) 68, which encodes, modulates, upconverts and amplifies the message. The message is then transmitted through duplexer 52 and antenna 50.

Figure 4:
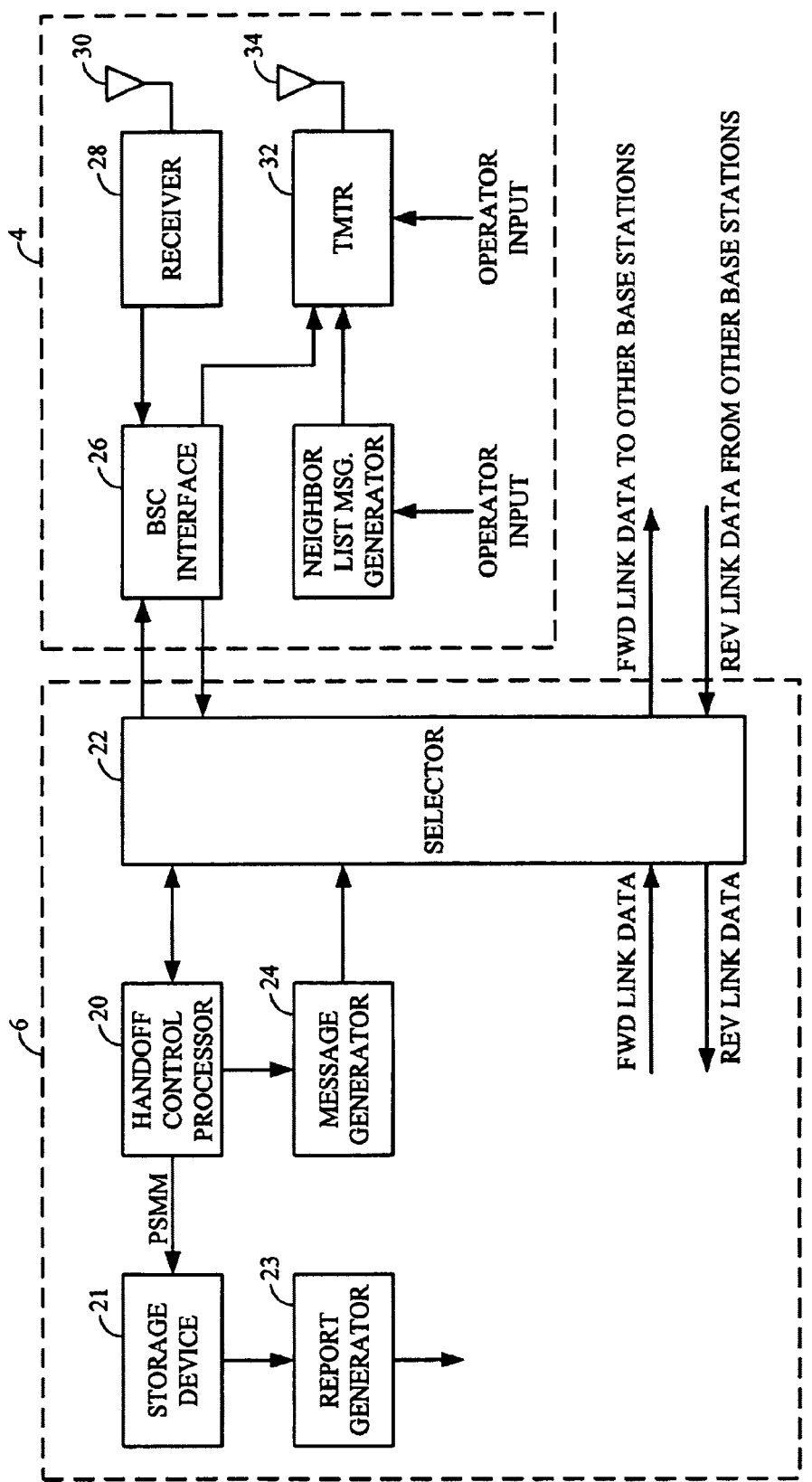
FIG. 4 is a block diagram of the base station and base station controller of the present invention.

Referring to FIG. 4, the Pilot Strength Measurement Message is received by antenna 30 of base station 4 and provided to receiver (RCVR) 28, which amplifies, down converts, demodulates and decodes the received signal and provides the message to base station controller interface 26. Base station controller interface 26 sends the message to base station controller (BSC) 6. The message is provided to selector 22, which may also receive the message redundantly from other base stations which are in communication with mobile station 2. Selector 22 combines message estimates received from the base stations in communication with mobile station 2 to provide an improved estimate of the received information. Selector 22 provides the pilot strength measurement message to hand-off control processor 20.

Handoff control processor 20 determines which base stations should be in active communication with mobile station 2 based on the available channel resources of base stations 4 and the information in the pilot strength measurement message. After determining the set of base stations 4 that should be in active communication with mobile station 2, hand-off control processor 20 provides the information to selector 22 indicating the identities of the base stations to provide active communications to mobile station 2. In response to the set of base stations provided by hand-off control processor 20, selector 22 allocates traffic channels for performing communications to mobile station 2. In addition, handoff control processor 20 provides the information provided in the pilot strength measurement message to PSMM database 21. In the exemplary embodiment, PSMM database 21 stores the PSMM data in magnetic format or optical format.

Hand-off control processor 20 provides a message indicating the set of base stations to message generator 24. Message generator 24 generates a message for transmission to mobile station 2, referred to as the handoff direction message. The handoff direction message indicates the base stations that will provide communications with mobile station 2 and corresponding traffic channels those base stations will use to communicate with mobile station 2. The message is provided through selector 22 and provided to the base stations which were in communication with mobile station 2 prior to the transmission of the pilot strength measurement message. The base stations in communication with mobile station 2 transmit the handoff direction message to mobile station 2.

Referring back to FIG. 3, the handoff direction message is received by antenna 50 of mobile station 2. It is provided to receiver 54, which amplifies, downconverts, demodulates and decodes the message and provides the handoff direction message to control processor 62. Control processor 62, then, configures the traffic channel demodulators 64A–64N to demodulate traffic channels in accordance with the base stations identified in the handoff direction message.

After a predetermined period of time or a predetermined number of pilot strength measurement messages have been received by base station 4A, report generator 23 prompts PSMM database 21 for the PSMM data. In the exemplary embodiment, report generator 23 sorts the information in the received pilot strength measurement messages according to the base station reported. Then, for each base station reported in a PSMM transmitted to base station 4A, report generator 23 computes the average energy reported, the maximum energy reported and the minimum energy reported. An exemplary report generated by report generator 23 is illustrated in FIG. 5.

Figure 5:
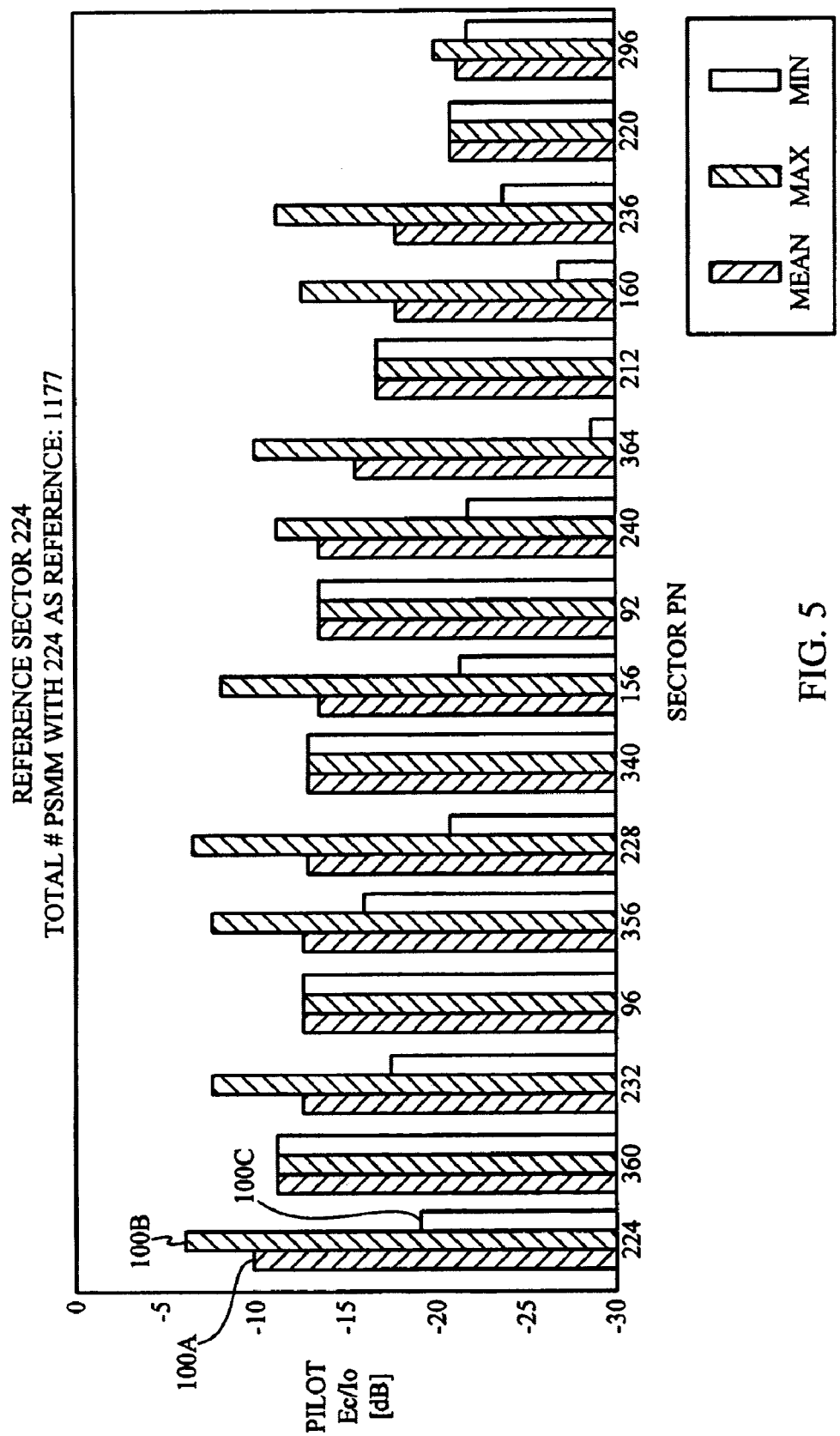
FIG. 5 is an exemplary report of compiled statistics from pilot strength measurement messages.

Referring to FIG. 5, the data for each pilot strength measurement message reported to a base station with PN offset 224 (base station 4A) are presented. Along the horizontal axis the base station reported is identified by its PN offset (Sector PN). Looking at the information provided for base station (or sector) 224 three pieces of information 100A, 100B and 100C are provided. 100A is the mean reported pilot strength for base station with PN offset 224, 100B is the maximum reported pilot strength for that base station and 100C is the minimum reported strength for that base station.

In analyzing the data, the system designer first analyzes the reports for base station with PN offsets 220 and 296 (base stations 4L and 4M). These base stations have been received with insufficient power to provided reliable communications with mobile station 2. A first course of action with respect to these base stations is to determine whether they are identified in the neighbor list transmitted on the base station 4A's paging or traffic channel. If either of these base stations is identified in the neighbor list of base station 4A, it should be removed because of its inability to provide reliable communications to mobile station 2. As described earlier, this will make the search procedure for mobile stations in communication with the base station 4A more efficient. Referring back to FIG. 4, the system designer, based on the report generated by report generator 23, would determine the membership of a revised neighbor list. This neighbor set would then be input to neighbor list message generator 31. The neighbor list message is then provided to transmitter 32 which transmits the neighbor list to mobile station 2 on the traffic or paging channel.

Reducing the members of the neighbor list has the effect of allowing the mobile station to search the true neighbors at a faster rate which improves system performance. Also, sometime the mobile station will report pilots that were not in the neighbor list but it found as part of the remainder set in some cases therefore PSMM's will help add pilots to the neighbor list not just delete some.

The ultimate goal beside neighbor list tuning is really to optimize the spatial isolation as much as possible between base stations, i.e. limit as much as feasible the interference from base stations that are far away, e.g. if the number of pilot PN's reported for a given reference pilot is very large that means that base stations which are 2 rings or maybe even 3 rings out are generating interference. In most cases these base stations do not provide coverage in these areas just low level interference which reduces the capacity of a given sector.

Thus, a second course of action in the supplementary configuration of the network is to determine whether action should be taken with respect to the base stations 4L and 4M. Base stations in a CDMA communication systems operate on the same frequency band. The operation of a cellular communication system depends on spatial isolation of the cell coverage areas. In a CDMA system, some coverage overlap is desirable because this enables a mobile station to be placed into a soft handoff when it is located near cell boundaries. However, the signals which is spilling over from the base stations 4L and 4M are not providing a useful communications to mobile stations, and in addition are serving as a source of in band interference to communications from base station 4A. The network may be further optimized by reducing the amount of spillover from base stations 4L and 4M.

A preferred method for reducing the undesirable spill over from base stations 4L and 4M is to down tilt their antennas which will restricts the RF emanations to their desired cell coverage area. Alternative methods for reducing the spill over include moving the base station to an different location. For example, if the base station is located on top of a six story building, the spill over can be reduced by moving the base station to a lower position. Additional procedures that can be used to reduce undesirable spillover include, changing the total transmit power of the base station or adjusting the base station's azimuth angle. These steps can be taken based on the report generated to optimize the amount of spatial isolation of the coverage areas of the base stations in a cellular network.

In addition, the information collected in the pilot strength measurement messages can be fed back into the simulation programs. This provides improved simulation of the cellular network and will also result in improved generation of variable parameter values.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for optimizing a network's configuration, comprising the steps of:
    collecting pilot strength measurements for each base station including in said network;
    saving said pilot strength measurements in a base station, wherein said pilot strength measurements are saved regardless of the measurement value;
    requesting a majority of said saved pilot strength measurements from said database;
    compiling said pilot strength measurements for said each base station;
    saving compiled pilot strength measurement in a database; and
    modifying the transmission characteristics of said each base station in accordance with said compiled pilot strength measurements.

2. The method in accordance with claim 1, further comprising the step of using said compiled pilot strength measurements to simulate a cellular network.

3. The method in accordance with claim 1, wherein compiling said pilot strength measurements comprises the steps of:
    determining an average energy for said pilot strength measurements for said each base station;
    determining a maximum energy for a one of said pilot strength measurements for said each base station; and
    determining a minimum energy for a one of said pilot strength measurements for said each base station.

4. The method in accordance with claim 3, further comprising the steps of:
    analyzing the data compiled for said each base station to determine if said data indicates that a reliable communication between a mobile station and said each base station may be maintained;
    if a reliable communication with said mobile station cannot be maintained by at least one of said each base station, then:
    determining If said at least one of said each base station is in a neighbor list of said mobile station; and
    communicating to said mobile station to remove said at least one of said each base station from said neighbor list.

5. The method In accordance with claim 1, further comprising modifying the transmission characteristics of at least one of said each base station by changing the location of said at least one of said each base station.

6. The method in accordance with claim 1, further comprising modifying the transmission characteristics of at least one of said each base station by adjusting the spatial characteristics of an antenna used to transmit a signal from said at least one of said each base station.

7. An apparatus for optimizing a wireless communication network's configuration, comprising:
    means for collecting pilot strength measurements for each base station included in the network;
    means for saving the pilot strength measurements to a database, wherein the pilot strength measurements are saved regardless of the measurement value;
    a means for requesting a majority of the saved pilot strength measurements form the database;
    a means for compiling the pilot strength measurements for each base station; and
    a means for modifying the transmission characteristics of each base station in accordance with the compiled pilot strength measurements.

8. The apparatus in accordance with claim 7, wherein the means for compiling the pilot strength measurements further comprises:

means for determining an average energy for the pilot strength measurements for said each base station, a maximum energy for a one of the pilot strength measurements for each base station, and a minimum energy for a one of the pilot strength measurements for each base station.

9. The apparatus in accordance with claim 8, wherein the means for compiling the pilot strength measurements further comprises:

means for analyzing the data compiled for each station to determine if the data indicates that a reliable communication between a mobile station and each base station may be maintained;

if reliable communication with mobile station cannot be maintained by at least one of the each base station, then determining if the at least one of the each base station is in a neighbor list of the mobile station.

10. The apparatus in accordance with claim 9, further comprising:

a means for communicating to said mobile station to remove the at least one of the each base station from the neighbor list.

11. The apparatus in accordance with claim 10, further comprising a means for modifying the transmission characteristics of at least one of said each base station by adjusting the spatial characteristics of an antenna used to transmit a signal from the at least one of the base station.

12. An apparatus for optimizing a wireless communication network's configuration, comprising:

a signal processing device for collecting pilot strength measurements for each base station included in the network;

a storage device communicatively connected to the signal processing device and used to save the pilot strength measurements, wherein the pilot strength measurements are saved regardless of the measurement value;

wherein the signal processing device can request a majority of the saved pilot strength measurements from the database when desired, compile the pilot strength measurements for each base station, and cooperate in modifying the transmission characteristics of each base station in accordance with the compiled pilot strength measurements.

13. The apparatus in accordance with claim 12, wherein the signal processing device further determines an average energy for the pilot strength measurements for each base station, a maximum energy for a one of the pilot strength measurements for each base station, and a minimum energy for a one of the pilot strength measurements for each base station.

14. The apparatus in accordance with claim 13, wherein the signal processing device analyzes the data compiled for each base station to determine if the data indicates that a reliable communication between a mobile station and each base station may be maintained, and if a reliable communication with mobile station cannot be maintained by at least one of the each base station, then determining if the at least one of the each base station is in a neighbor list of the mobile station.

15. The apparatus in accordance with claim 14, further comprising a transmitter coupled to the signal processing device and used to communicate to the mobile station a command to remove the at least one of the each base station from the neighbor list.

16. The apparatus in accordance with claim 15, further comprising;

an antenna coupled to the transmitter and used to transmit a signal from the at least one of the base stations, wherein the transmission characteristics of the at least one of the base stations is adjusted by changing the spatial characteristics of the antennas.

* * * * *